(12) United States Patent
Bai et al.

(10) Patent No.: US 12,086,981 B2
(45) Date of Patent: Sep. 10, 2024

(54) METHODS AND SYSTEMS FOR COMPUTER-ASSISTED MEDICAL IMAGE ANALYSIS USING SEQUENTIAL MODEL

(71) Applicant: SHENZHEN KEYA MEDICAL TECHNOLOGY CORPORATION, Shenzhen (CN)

(72) Inventors: Junjie Bai, Seattle, WA (US); Hao-Yu Yang, Seattle, WA (US); Youbing Yin, Kenmore, WA (US); Qi Song, Seattle, WA (US)

(73) Assignee: SHENZHEN KEYA MEDICAL TECHNOLOGY CORPORATION, Shenzhen (CN)

( * ) Notice: Subject to any disclaimer, the term of this patent is extended or adjusted under 35 U.S.C. 154(b) by 385 days.

(21) Appl. No.: 17/557,449

(22) Filed: Dec. 21, 2021

(65) Prior Publication Data
US 2022/0215534 A1   Jul. 7, 2022

Related U.S. Application Data

(60) Provisional application No. 63/133,766, filed on Jan. 4, 2021.

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/20092* (2013.01);
(Continued)

(58) Field of Classification Search
CPC .................. G06T 7/0012; G06T 7/11; G06T 2207/20092; G06T 2207/30096;
(Continued)

(56) References Cited

U.S. PATENT DOCUMENTS 10,937,549 B2 *   3/2021   Ma ..................... A61B 5/0261
11,638,522 B2 *   5/2023   Abramoff ........... A61B 3/0016
                                                              351/246
(Continued)

FOREIGN PATENT DOCUMENTS

EP         3142069 A1 *   3/2017   .......... G06K 9/6276
WO   WO-2017062759 A1 *   4/2017   ............... A61B 3/10

*Primary Examiner* — Mahendra R Patel
(74) *Attorney, Agent, or Firm* — Bayes PLLC

(57) ABSTRACT

Embodiments of the disclosure provide systems and methods for analyzing a medical image containing a vessel structure using a sequential model. An exemplary system includes a communication interface configured to receive the medical image and the sequential model. The sequential model includes a vessel extraction sub-model and a lesion analysis sub-model. The vessel extraction sub-model and the lesion analysis sub-model are independently or jointly trained. The exemplary system also includes at least one processor configured to apply the vessel extraction sub-model on the received medical image to extract location information of the vessel structure. The at least one processor also applies the lesion analysis sub-model on the received medical image and the location information extracted by the vessel extraction sub-model to obtain a lesion analysis result of the vessel structure. The at least one processor further outputs the lesion analysis result of the vessel structure.

18 Claims, 6 Drawing Sheets

(52) U.S. Cl.
CPC ............... *G06T 2207/30096* (2013.01); *G06T 2207/30101* (2013.01); *G06T 2207/30172* (2013.01)

(58) Field of Classification Search
CPC . G06T 2207/30101; G06T 2207/30172; G06T 7/70
USPC ......................................................... 382/128
See application file for complete search history.

(56) References Cited

U.S. PATENT DOCUMENTS

| | | | |
|---|---|---|---|
| 2010/0092064 A1* | 4/2010 | Li ........................ | A61B 5/7264 382/133 |
| 2014/0073977 A1* | 3/2014 | Grady ................ | A61B 5/14535 600/504 |
| 2015/0112182 A1* | 4/2015 | Sharma ................ | A61B 5/0261 600/408 |
| 2015/0335304 A1* | 11/2015 | Lavi ........................ | G16H 30/40 600/407 |
| 2015/0339847 A1* | 11/2015 | Benishti ................. | A61B 5/026 382/131 |
| 2016/0110517 A1* | 4/2016 | Taylor .................... | A61B 5/029 345/419 |
| 2017/0148158 A1* | 5/2017 | Najarian ................... | G06T 5/77 |
| 2017/0293735 A1* | 10/2017 | Itu .......................... | G16H 50/50 |
| 2017/0325770 A1* | 11/2017 | Edic ........................ | A61B 6/503 |
| 2018/0330507 A1* | 11/2018 | Schormans ............. | A61B 5/33 |
| 2018/0344173 A1* | 12/2018 | Tu ....................... | A61B 5/02007 |
| 2019/0130578 A1* | 5/2019 | Gulsun ................. | G06N 3/045 |
| 2020/0327979 A1* | 10/2020 | Ishii ..................... | G16H 30/40 |
| 2020/0380675 A1* | 12/2020 | Golden .................. | G06T 7/143 |
| 2020/0394795 A1* | 12/2020 | Isgum .................... | G06N 20/00 |

\* cited by examiner

METHODS AND SYSTEMS FOR COMPUTER-ASSISTED MEDICAL IMAGE ANALYSIS USING SEQUENTIAL MODEL

CROSS-REFERENCE TO RELATED APPLICATION

This application claims the benefit of priority to U.S. Provisional Application No. 63/133,766, filed on Jan. 4, 2021, the entire content of which is incorporated herein by reference in its entirety.

TECHNICAL FIELD

The present disclosure relates to systems and methods for medical image analysis, and more particularly to, systems and methods for analyzing a medical image containing a vessel structure using a sequential model.

BACKGROUND

A medical image analysis system is usually designed to conduct multiple tasks based on a medical image. For example, the system may segment blood vessels in the medical image and detect lesions along the blood vessels. However, existing systems typically conduct the multiple tasks independently, in a way that neglects the potential relationships among tasks. The analysis results provided by the multiple tasks are thereby often inconsistent with each other.

For example, a lesion detection model trained by existing systems usually does not consider vessel information in the medical images. The trained lesion detection model therefore may produce many false positives (e.g., lesions detected in non-vessel regions), This type of error can be greatly reduced if the vessel location information is considered during lesion detection process (e.g., detect lesions along vessel centerline). As another example, a vessel segmentation task is conducted without following the vessel centerline or considering existing lesions along the vessels. As a result, the system may return a broken vessel segmentation mask due to a severe lesion stenosis in the vessel.

In addition, the existing medical image analysis systems usually are not able to easily incorporate human interventions to adjust an analysis result. For example, the existing systems do not include an independent human intervention editing unit to transform different format of human intervention (e.g., dragging, dropping, adding scribbles, or erasing operations) into a uniform format, e.g., modification mask or modified vessel centerline.

Embodiments of the disclosure address the above problems by introducing systems and methods for analyzing a medical image containing a vessel structure using a sequential model.

SUMMARY

In one aspect, embodiments of the disclosure provide systems for analyzing a medical image containing a vessel structure using a sequential model. An exemplary system includes a communication interface configured to receive the medical image and the sequential model. The sequential model includes a vessel extraction sub-model and a lesion analysis sub-model. The vessel extraction sub-model and the lesion analysis sub-model are independently or jointly trained. The exemplary system also includes at least one processor configured to apply the vessel extraction sub-model on the received medical image to extract location information of the vessel structure. The at least one processor also applies the lesion analysis sub-model on the received medical image and the location information extracted by the vessel extraction sub-model to obtain a lesion analysis result of the vessel structure. The at least one processor further outputs the lesion analysis result of the vessel structure.

In another aspect, embodiments of the disclosure also provide methods for analyzing a medical image containing a vessel structure using a sequential model. An exemplary method includes receiving, by a communication interface, the medical image and the sequential model. The sequential model includes a vessel extraction sub-model and a lesion analysis sub-model. The vessel extraction sub-model and the lesion analysis sub-model are independently or jointly trained. The method also including applying, by at least one processor, the vessel extraction sub-model on the received medical image to extract location information of the vessel structure. The method further includes applying, by the at least one processor, the lesion analysis sub-model on the received medical image and the location information extracted by the vessel extraction sub-model to obtain a lesion analysis result of the vessel structure. The method additionally includes outputting, by the at least one processor, the lesion analysis result of the vessel structure.

In yet another aspect, embodiments of the disclosure further provide a non-transitory computer-readable medium having instructions stored thereon that, when executed by at least one processor, causes the at least one processor to perform a method for analyzing a medical image containing a vessel structure using a sequential model. The method includes receiving the medical image and the sequential model. The sequential model includes a vessel extraction sub-model and a lesion analysis sub-model. The vessel extraction sub-model and the lesion analysis sub-model are independently or jointly trained. The method also includes applying the vessel extraction sub-model on the received medical image to extract location information of the vessel structure. The method further includes applying the lesion analysis sub-model on the received medical image and the location information extracted by the vessel extraction sub-model to obtain a lesion analysis result of the vessel structure. The method additionally includes outputting the lesion analysis result of the vessel structure.

It is to be understood that both the foregoing general description and the following detailed description are exemplary and explanatory only and are not restrictive of the invention, as claimed.

DETAILED DESCRIPTION

Figure 1:
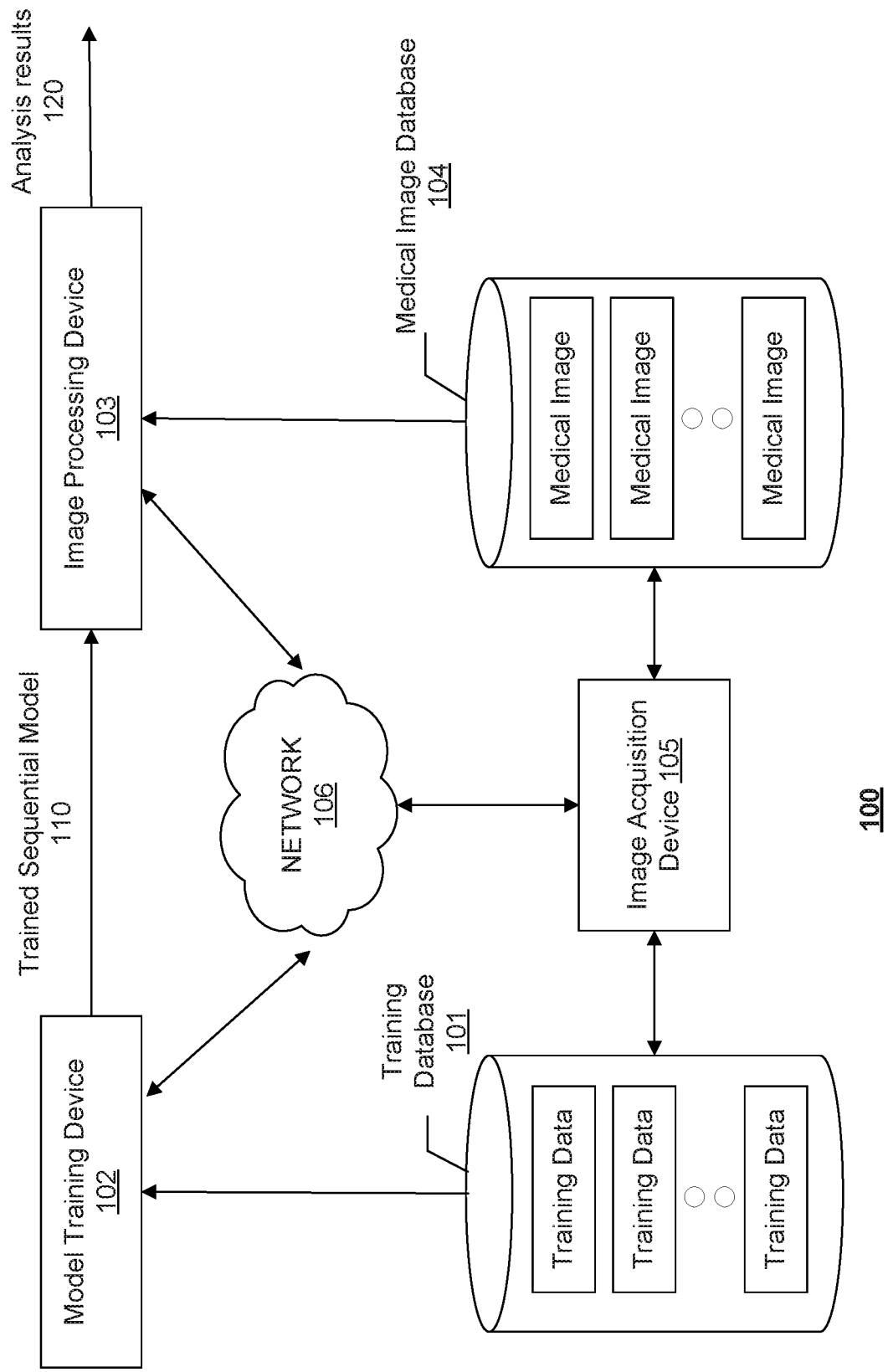
FIG. 1 illustrates a schematic diagram of an exemplary medical image analysis system for analyzing a medical image, according to embodiments of the disclosure.

Reference will now be made in detail to the exemplary embodiments, examples of which are illustrated in the accompanying drawings.

The disclosed systems and methods use an end-to-end, sequential model for performing various tasks, such as analyzing a medical image to solve lesion detection and vessel segmentation problems. In some embodiments, this sequential model may utilize a divide-and-conquer strategy to divide a big task into one or more simpler/smaller tasks. For example, an image analysis task can be divided into one or more related medical image analysis tasks. Multiple sub-models are then assigned to solve these individual simpler/smaller tasks. These sub-models, whose input may depend on output of other sub-models, are sequentially executed. Results of some sub-tasks can be reused by one or more other sub-tasks. As a result, a sub-model can be easier rained to solve a sub-task, because less training data is generally required for training the sub-model than a single model. In addition, consistency among multiple related tasks can be ensured. Also, the sequential structure of the sub-models makes it easier to incorporate human intervention as input to certain sub-model at its convenient format/representation.

An exemplary sequential model for vessel image analysis may include three sub-models: a vessel extraction sub-model configured to extract vessel locations from the medical image, a lesion analysis sub-model configured to detect lesions and analyze the detected lesions, and a vessel segmentation sub-model configured to refine vessel boundary and obtain a vessel segmentation mask. In some embodiments, the vessel extraction sub-model may receive a first user edit to adjust vessel location information of the vessel structure in the medical image. The lesion analysis sub-model may receive a second user edit to adjust a lesion analysis result of the vessel structure in the medical image. The vessel segmentation sub-model may receive a third user edit to adjust a segmentation task of the vessel structure in the medical image. In some embodiments, the first user edit, the second user edit, and the third user edit are independent from each other. It is contemplated that the task being handled by the disclosed sequential model can be any task beyond image analysis tasks. The sub-models will be designed accordingly to solve the respective sub-tasks.

In some embodiments, the sequential model is applied on the medical image and/or the user edits in three stages. For example, the vessel extraction sub-model of the sequential model is firstly applied on the received medical image and/or the first user edit to extract location information of the vessel structure in the received medical image. Secondly, the lesion analysis sub-model of the sequential model is applied on the received medical image, the location information extracted by the vessel extraction sub-model, and/or the second user edit, to obtain a lesion analysis result of the vessel structure in the received medical image. Thirdly, the vessel segmentation sub-model of the sequential model is applied on the received medical image, the location information extracted by the vessel extraction sub-model, the lesion analysis result of the vessel structure generated by the lesion analysis sub-model, and/or the third user edit, to segment the vessel structure from the received medical image. In some embodiments, the sequential model may receive the medical image, the first user edit, the second user edit, and the third user edit, as inputs, and output the lesion analysis result of the vessel structure and a segmentation mask of the vessel structure.

The disclosed systems and methods do not treat the medical image analysis tasks independently. Instead, the disclosed system and method apply each sub-model of the sequential model on the received medical image in a sequential manner to create a unified solution for the related medical image analysis tasks (e.g., nearby anatomical locations, or on a same target anatomy). Analysis results of each output (e.g., detected lesion, segmented vessels) therefore are consistent with each other.

The disclosed systems and methods offer five major advantages over existing techniques: (1) interdependent image analysis tasks are solved in a unified way, and not treated independently; (2) an interdependent relationship among the related image analysis tasks are enforced by the disclosed system and method to ensure consistent results for the related image analysis tasks (such as vessel segmentation and lesion quantification); (3) a better performance for each image analysis task can be achieved based on intermediate results of upstream age analysis tasks; (4) modeling and training are easier and faster because less training data is required for training each sub-model; and (5) extra information such as human intervention can be easily incorporated into the disclosed system and method in a convenient format/representation (such as vessel centerline).

FIG. 1 illustrates a schematic diagram of an exemplary medical image analysis system 100 (hereinafter also referred to as system 100) for analyzing a medical image, according to some embodiments of the present disclosure. Consistent with the present disclosure, system 100 is configured to analyze a medical image acquired by an image acquisition device 105. In some embodiments, image acquisition device 105 may be using one or more imaging modalities, including, e.g., Magnetic Resonance Imaging (MRI), Computed Tomography (CT), functional MRI (e.g., fMRI, DCE-MRI and diffusion MRI), Cone Beam CT (CBCT), Positron Emission Tomography (PET), Single-Photon Emission Computed. Tomography (SPECT), X-ray, Optical Coherence Tomography (OCT), fluorescence imaging, ultrasound imaging, and radiotherapy portal imaging, etc. In some embodiments, image acquisition device 105 may capture images containing at least one tree structure object, such as blood vessels. For example, image acquisition device 105 may be an MRI scanner or a CT scanner that captures coronary vessel images, or an OCT device that captures retinal vessel images. In some embodiments, the medical image captured may be two dimensional (2D) or three dimensional (3D) images. A 3D image may contain multiple 2D image slices.

As shown in FIG. 1, system 100 may include components for performing two phases, a training phase and a prediction phase. To perform the training phase, system 100 may include a training database 101 and a model training device 102. To perform the prediction phase, system 100 may include an image processing device 103 and a medical image database 104. In some embodiments, system 100 may include more or less of the components shown in FIG. 1. For example, when a sequential model for analyzing a medical image is pre-trained and provided, system 100 may include only image processing device 103 and medical image database 104.

System 100 may optionally include a network 106 to facilitate the communication among the various components of system 100, such as databases 101 and 104, devices 102,

103, and 105. For example, network 106 may be a local area network (LAN), a wireless network, a cloud computing environment (e.g., software as a service, platform as a service, infrastructure as a service), a client-server, a wide area network (WAN), etc. In some embodiments, network 106 may be replaced by wired data communication systems or devices.

In some embodiments, the various components of system 100 may be remote from each other or in different locations, and be connected through network 106 as shown in FIG. 1. In some alternative embodiments, certain components of system 100 may be located on the same site or inside one device. For example, training database 101 may be located on-site with or be part of model training device 102. As another example, model training device 102 and image processing device 103 may be inside the same computer or processing device.

Model training device 102 may use the training data received from training database 101 to train a sequential model for analyzing a medical image received from, e.g., medical image database 104. As shown in FIG. 1, model training device 102 may communicate with training database 101 to receive one or more sets of training data which can be 2D or 3D images. Each set of training data may include at least one medical image and its corresponding ground truth that provides the analysis result for each medical image. In some embodiments, the ground truth analysis results can be final results of the entire model or intermediate results of sub-models. For example, the analysis result may include vessel location information, lesion analysis result, vessel segmentation mask, or other derived results in various formats such as distance transform, feature map, probability map, etc.

In some embodiments, the training phase may be performed "online" or "offline." An "online" training refers to performing the training phase contemporarily with the prediction phase, e.g., the model in real-time just prior to analyzing a new medical image. An "online" training may have the benefit to obtain a most updated model based on the training data that is then available. However, an "online" training may be computational costive to perform and may not always be possible if the training data is large and/or the model is complicate. Consistent with the present disclosure, an "offline" training is used where the training phase is performed separately from the prediction phase. The sequential model trained offline is saved and reused for analyzing new medical images.

Model training device 102 may be implemented with hardware specially programmed by software that performs the training process. For example, model training device 102 may include a processor and a non-transitory computer-readable medium (discussed in detail in connection with FIG. 4). The processor may conduct the training by performing instructions of a training process stored in the computer-readable medium. Model training device 102 may additionally include input and output interfaces to communicate with training database 101, network 106, and/or a user interface (not shown). The user interface may be used for selecting sets of training data, adjusting one or more parameters of the training process, selecting or modifying a framework of the sequential model, and/or manually or semi-automatically providing prediction results associated with an image for training.

Consistent with some embodiments, the sequential model trained by model training device 102 may be a machine learning model (e.g., deep learning model) that include at least two sub-models, e.g., a vessel extraction sub-model configured to extract location information of the vessel structure in the received medical image and a lesion analysis sub-model configured to obtain a lesion analysis result based on the location information extracted by the vessel extraction sub-model and the received medical image. In sonic embodiments, the sequential model may include more than two sub-models. For example, the sequential model may additionally include a third sub-model, e.g., vessel segmentation sub-model configured to refine vessel boundary based on output of the two upstream sub-models, e.g., the vessel extraction sub-model and the lesion analysis sub-model.

In some embodiments, the sequential model may be a formulated according to a known mathematical relationship (e.g., dynamical system, statistical model, differential equation, or game theoretic model). For example, the sequential model is modeled through explicitly given mathematical functions. In some alternative embodiments, the sequential model may be a hybrid model, including machine learning sub-models and mathematical sub-models. For example, the machine learning sub-models are trained and tuned using artificial neural network or other machine learning methods, while the parameters of the mathematical sub-models determined by curve fitting. However, it is contemplated that the structure of the sequential model is not limited to what is disclosed as long as the sub-models in the sequential model encode a sequential relationship (e.g., input of a downstream sub-model depends on at least one of output of an upstream sub-model) and the sub-models are sequentially executed for analyzing the new medical image.

Figure 2:
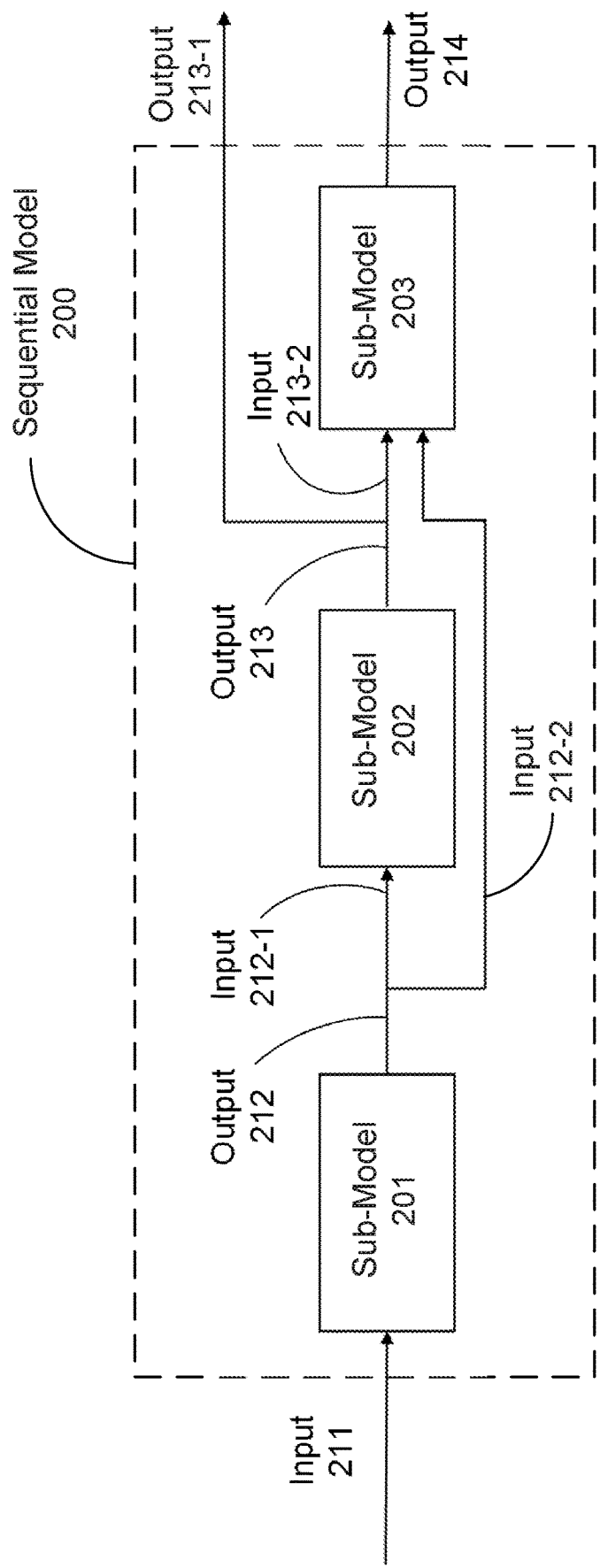
FIG. 2 illustrates a flow diagram of an exemplary sequential model for analyzing a medical image, according to embodiments of the disclosure.

For example, FIG. 2 illustrates a flow diagram of an exemplary sequential model 200 for analyzing a medical image, according to embodiments of the disclosure. As shown in FIG. 2, sequential model 200 (hereinafter also referred to as model 200) may receive an input 211 (e.g., a medical image containing a vessel structure from medical image database 104) and generate outputs 213-1 and 214. Model 200 may include three sub-models 201, 202, and 203. The sub-models are sequentially applied on input 211. For example, sub-model 201 receives input 211 to generate an output 212 (e.g., location information of the vessel structure) to feed downstream sub-models 202 and 203. Sub-model 202 receives an input 212-1 (e.g., derived from output 212) to generate an output 213, e.g., including the lesion analysis result of the vessel structure. Sub-model 202 then may send output 213-1 (e.g., derived from output 213) out of model 200. Sub-model 203 receives an input 213-2 (e.g., derived from output 213) and an input 212-2 (e.g., derived from output 212) to generate output 214 (e.g., a segmentation mask of the vessel structure). Sub-model 203 then provides output 214 as part of output of model 200 (e.g., analysis results 120).

Figure 3:
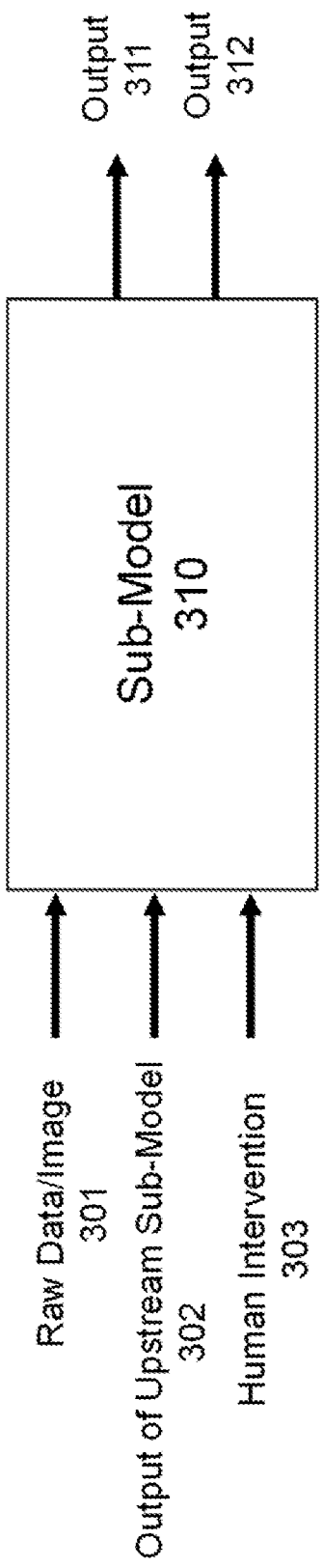
FIG. 3 illustrates a flow diagram of an exemplary sub-model of a sequential model, according to embodiments of the disclosure.

FIG. 3 illustrates a flow diagram of an exemplary sub-model 310 of a sequential model, according to embodiments of the disclosure. As shown in FIG. 3, sub-model 310 (as an exemplary sub-model in the disclosed sequential model) may receive at least one of raw data/image 301, output of upstream sub-model 302, or human intervention 303. Consistent with some embodiments, raw data/image 301 can be acquired by image acquisition devices 105 and stored in medical image database 104. For example, raw data/image 301 (e.g., input 211 in FIG. 2) can be a 2D/3D medical image or other types of raw data generated by an MRI scanner or CT scanner (as an example of image acquisition devices 105).

In some embodiments, output of upstream sub-model 302 can be an analysis result of the medical image (e.g raw data/image 301) generated by an upstream sub-model (e.g., sub-model 201 or sub-model 202 in FIG. 2). For example, the medical image analysis result may include vessel location information or lesion analysis information produced by the upstream sub-model in the format of a feature map, a probability map, a bounding box, or the like. In some embodiments, human intervention 303 can be an edit entered by a user (e.g., doctor, professional, expert operator) based on their knowledge and experience. In some embodiments, the user edit is input in a form of editing masks, dragging/dropping operations, adding scribbles, erasing operations, etc.

In some embodiments, sub-model 310 may generate at least one output (e.g., output 311). For example, output 311 can be internally used to feed downstream sub-models input 212-1, input 213-2 in FIG. 2) but not exported out of system 100 as part of the analysis results. For example, if sub-model 310 is a lesion analysis sub-model, output 311 may include lesion analysis result such as a lesion detection bounding box, information of the lesion characterization and quantization. A downstream sub-model (e.g., vessel segmentation sub-model) for refining a vessel boundary can take output 311 as input and generate a pixelwise vessel segmentation mask. In some embodiments, sub-model 310 may generate a second output output 312) which can be exported out of the medical image analysis system. For example, if sub-model 310 is a lesion analysis sub-model, output 312 can be a lesion detection bounding box, a probability map, a segmentation mask, or other representation of lesion location information. Output 312 may be exported out of system 100 as part of analysis results 120. In some embodiments, the inputs and outputs of sub-model 310 can be shown in other transformed versions such as a dilated centerline, a Gaussian field heat map around key points, a point in a transformed space such as polar coordinates, or the like.

Returning to FIG. 1, model training device 102 may train initially the sequential model by training each sub-model individually. Consistent with some embodiments, for training an individual sub-model (e.g., sub-model 310), model training device 102 may receive a set of training data including a medical image (e.g., raw data/image 301), an output of a previously trained upstream sub-model (e.g., output of upstream sub-model 302). If the upstream sub-model is not trained yet or sub-model 310 does not have an upstream sub-model, an expert's manual annotation (e.g., identification of vessel or lesion locations) can be used to substitute output of the upstream sub-model 302. Model training device 102 may further receive a user edit/simulation (e.g., human intervention 303) as part of the training data. In addition, each received training data set may include a ground truth output (e.g., outputs 311 and/or 312) which can be obtained using a similar method as of output of upstream sub-model 302 (e.g., obtained from a previously trained sub-model or expert's manual annotation).

In some embodiments, model training device 102 may jointly train the individually trained sub-models. For example, model training device 102 may jointly optimize the parameters of adjacent sub-models (e.g., sub-models 201 and 202). Model training device 102 may then jointly optimize the parameters of sub-models 201, 202, and 203. The joint training may achieve a better performance in the final output of the disclosed system. The joint training may also guarantee a consistent result in the final output (e.g., outputs 213-1 and 214). For example, the lesion detection result is consistent with the vessel segmentation mask, and vice versa.

In some embodiments, when all sub-models are jointly trained, model training device 102 may integrate the trained sub-models into a sequential model and deploy the trained sequential model (e.g., trained sequential model 110) to image processing device 103. In some embodiments, trained sequential model 110 may be used by image processing device 103 to analyze new medical images. Image processing device 103 may include a processor and a non-transitory computer-readable medium (discussed in detail in connection with FIG. 4). The processor may perform instructions of an image analysis process stored in the medium. Image processing device 103 may additionally include input and output interfaces (discussed in detail in connection with FIG. 4) to communicate with medical image database 104, network 106, and/or a user interface (not shown). The user interface may be used for selecting a medical image for analysis, initiating h analysis process, displaying the medical image and/or the analysis results.

Image processing device 103 may communicate with medical image database 104 to receive one or more medical images. In some embodiments, the medical images stored in medical image database 104 may include 2D image slices from a 3D scan. The medical images may be acquired by image acquisition devices 105, image processing device 103 may uses trained sequential model 110 received from model training device 102 to analyze the received medical image received from medical image database 104. For example, image processing device 103 may first perform a vessel extraction to locate a rough profile of the vessel structure (e.g., vessel centerline) in the received medical image. Based on the location information of the vessel, image processing device 103 then locates, characterizes, or quantifies a lesion associated with the vessel structure (e.g., along the vessel path). Image processing device 103 may further refine a boundary of the vessel structure and generate a pixelwise vessel segmentation mask based on the lesion detection result and the vessel location information, image processing device 103 may export analysis results 120 (e.g., the segmentation mask and the lesion detection result) out of system 100.

Figure 4:
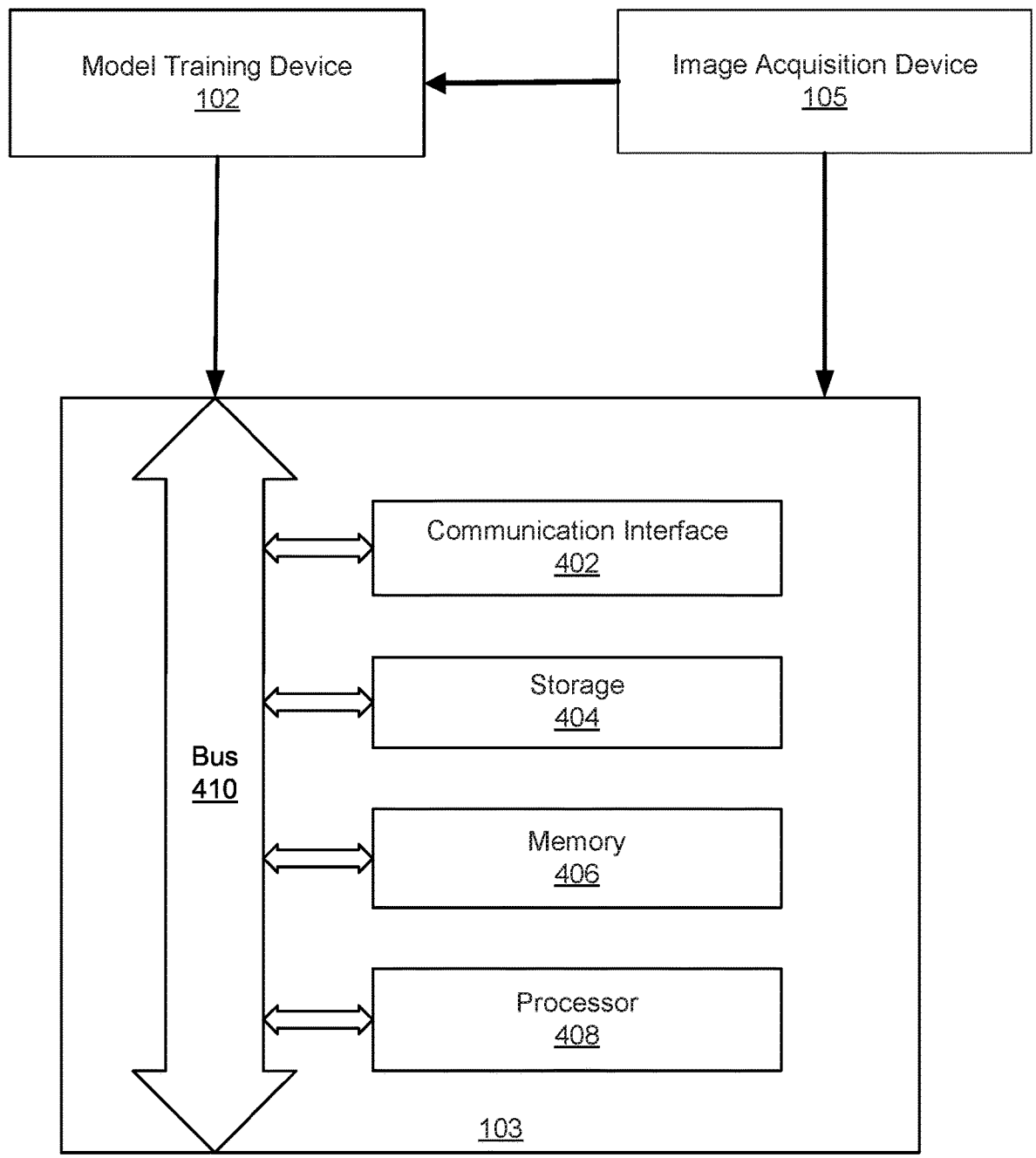
FIG. 4 illustrates a block diagram of an exemplary image processing device for analyzing a medical image, according to embodiments of the disclosure.

FIG. 4 illustrates a block diagram of an exemplary image processing device 103 for analyzing a medical image, according to embodiments of the disclosure. In some embodiments, image processing device 103 may be a special-purpose computer, or a general-purpose computer. For example, image processing device 103 may be a computer custom-built for hospitals to perform image acquisition and image processing tasks. As shown in FIG. 4, image processing device 103 may include a communication interface 402, a storage 404, a memory 406, a processor 408, and a bus 410. Communication interface 402, storage 404, memory 406, and processor 408 are connected with bus 410 and communicate with each other through bus 410.

Communication interface 402 may include a network adaptor, a cable connector, a serial connector, a USB connector, a parallel connector, a high-speed data transmission adaptor, such as fiber, USB 3.0, thunderbolt, and the like, a wireless network adaptor, such as a WiFi adaptor, a telecommunication (3G, 4G/LTE and the like) adaptor, etc. Image processing device 103 may be connected to other components of system 100 and network 106 through communication interface 402. In some embodiments, communication interface 402 receives medical image from image acquisition device 105. Consistent with some embodiments, the medical image captures a tree structure object, such as a vessel. For example, the medical image may be a coronary vessel image or a retinal vessel image. In some embodiments, communication interface 402 also receives the sequential model (e.g., trained sequential model 110) from modeling training device 102.

Storage 404/memory 406 may be a non-transitory computer-readable medium, such as a read-only memory (ROM), a random access memory (RAM), a phase-change random access memory (PRAM), a static random access memory (SRAM), a dynamic random access memory (DRAM), an electrically erasable programmable read-only memory (EEPROM), other types of random access memories (RAMs), a flash disk or other forms of flash memory, a cache, a register, a static memory, a compact disc read-only memory (CD-ROM), a digital versatile disc (DVD) or other optical storage, a cassette tape or other magnetic storage devices, or any other non-transitory medium that may be used to store information or instructions capable of being accessed by a computer device, etc.

In some embodiments, storage 404 may store the trained sequential model, e.g., trained sequential model 110, and data, such as location information of vessel structure (e.g., vessel centerline) generated while executing the computer programs, etc. In some embodiments, memory 406 may store computer-executable instructions, such as one or more image processing programs. In some embodiments, lesions may be detected based on the vessel centerline and the lesion information (e.g., location, characterization, quantization may be stored in storage 404. The lesion information may be read from storage 404 and stored in memory 406.

Processor 408 may be a processing device that includes one or more general processing devices, such as a microprocessor, a central processing unit (CPU), a graphics processing unit (GPU), and the like. More specifically, the processor may be a complex instruction set computing (CISC) microprocessor, a reduced instruction set computing (RISC) microprocessor, a very long instruction word (VLIW) microprocessor, a processor running other instruction sets, or a processor that runs a combination of instruction sets. The processor may also be one or more dedicated processing devices such as application specific integrated circuits (ASICs), field programmable gate arrays (FPGAs), digital signal processors (DSPs), system-on-chip (SoCs), and the like. Processor 408 may be communicatively coupled to memory 406 and configured to execute the computer-executable instructions stored thereon.

Figure 5:
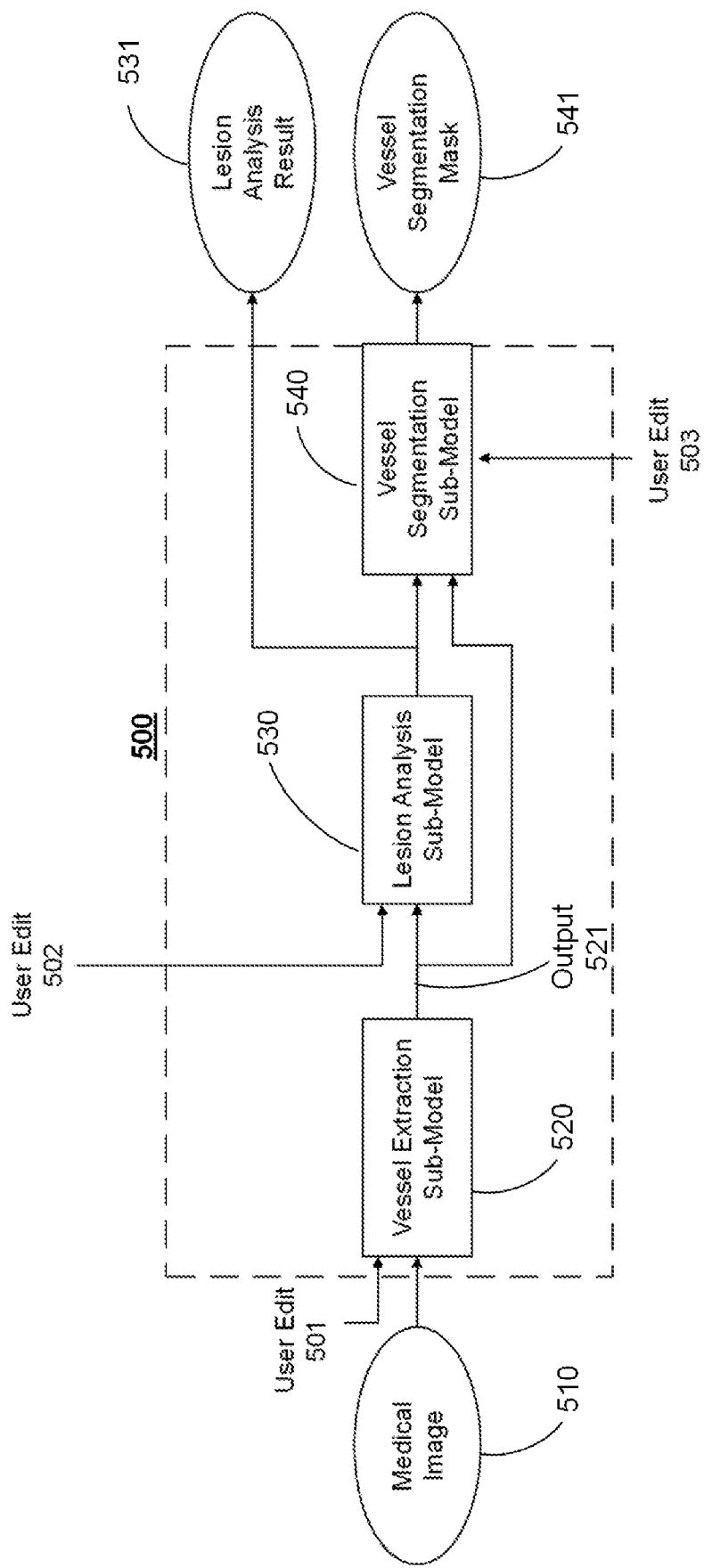
FIG. 5 illustrates a flow diagram of an exemplary sequential model for detecting lesions and segmenting vessels, according to embodiments of the disclosure.

In some embodiments, processor 408 is configured to analyze the received medical image. For example, processor 408 uses the trained sequential model to analyze the vessel structure in the received medical image, and outputs analysis results (e.g., lesion information, vessel segmentation mask). FIG. 5 illustrates a flow diagram of an exemplary sequential model 500 for detecting lesions and segmenting vessels, according to embodiments of the disclosure. As shown in FIG. 5, sequential model 500 may include a vessel extraction sub-model 520, a lesion analysis sub-model 530, and a vessel segmentation sub-model 540. Consistent with some embodiments, applying sequential model 500 on a medical image 510 may include sequentially applying vessel extraction sub-model 520, lesion analysis sub-model 530, and vessel segmentation sub-model 540 on medical image 510.

For example, vessel extraction sub-model 520 is applied on medical image 510 to extract vessel location information of the vessel structure in medical image 510. In some embodiments, the vessel location information (e.g., output 521) may be a rough profile of the vessel structure (e.g., vessel centerline shown in a form of distance transform) and is sent to downstream sub-models (e.g., lesion analysis sub-model 530 and vessel segmentation sub-model 540) as an input. For example, output 521 may be a distance transform indicating the centerline location of the vessel structure. In some alternative embodiments, output 521 may be a feature map, a probability map, or other representation of vessel location information. In some embodiments, output 521 is an intermediate data which only feeds one or more downstream sub-models. In other words, output 521 is not exported out of the sequential model.

In some embodiments, a human intervention (e.g., user edit 501) may be sent to vessel extraction sub-model 520 to influence the vessel extraction result. For example, an expert operator can change vessel overall location information at a large scale by adding scribbles via points, dragging and dropping to a different location, extending, or erasing existing vessel location via user edit 501. In some embodiments, an independent unit (not shown in FIG. 5) is used to transform different formats of human intervention, such as dragging and dropping, adding scribbles, extending, or erasing operations, into a uniform format (e.g., modified centerline) and then apply the uniform format on vessel extraction sub-model 520 to adjust output 521.

In some embodiments, the vessel location information (e.g., output 521) can be used to facilitate a lesion detection task. For example, lesion analysis sub-model 530 can detect lesion along the vessel path based on output 521. Because output 521 provides location information of the vessel structure in the medical image, lesion analysis sub-model 530 can search lesions along the vessel region, without wasting time on non-vessel region. In some embodiments, if one or more lesions are detected, lesion analysis sub-model 530 may further quantify and characterize the detected lesion. For example, lesion analysis sub-model 530 may determine a category of the detected vessel lesion (e.g., calcified, or non-calcified). In addition, lesion analysis sub-model 530 may calculate a stenosis degree of the detected lesion. In some embodiments, lesion analysis sub-model 530 generates a lesion analysis result 531 including detected lesion information (e.g., lesion location, lesion quantization, and lesion characterization) and exports it out of sequential model 500.

In some embodiments, a user may send a user edit 502 to lesion analysis sub-model 530 to edit lesion analysis result 531. The user can be the same expert operator who enters user edit 501 or a different expert operator. The user can use various operations (e.g., adding, dragging, dropping, extending, or erasing) to change lesion locations, lesion characterization (e.g., calcified or non-calcified), and lesion quantification (e.g., the stenosis degree). Consistent with some embodiments, an independent unit (not shown in FIG. 5) can be applied on user edit 502 to transform the various human operations into a uniform format to adjust lesion analysis result 531.

In some embodiments, a copy of lesion analysis result 531 and output 521 are used to refine vessel boundary in vessel segmentation sub-model 540. For example, vessel segmentation sub-model 540 can generate a pixelwise vessel segmentation mask (e.g., vessel segmentation mask 541) based on the information of the vessel locations (e.g., output 521) and the detected lesions (e.g., lesion analysis result 531). In some embodiments, the vessel segmentation mask can be a pixelwise or voxel-wise annotation of the received medical image with each pixel/voxel classified and labeled, e.g., with value 1 if the pixel/voxel belongs to a vessel or value 0 if otherwise. Vessel segmentation sub-model 540 may use the lesion location information (e.g., lesion analysis result 531) to refine vessel boundary around the lesion region. In some embodiments, vessel segmentation sub-model 540 may generates a probability map indicating the probability each pixel in the medical image belongs to the vessel structure. Vessel segmentation sub-model 540 may then perform a thresholding to obtain a pixelwise segmentation mask. For example, vessel segmentation sub-model 540 may set pixels of the segmentation mask to 1 when the corresponding probabilities in the probability map is above 0.8 (i.e., belong to the vessel structure) and the remaining pixels of the segmentation mask as 0 (i.e., not belong to the vessel structure). The threshold may be set by an operator or automatically selected by vessel segmentation sub-model 540.

In some embodiments, a user may send a human intervention (e.g., user edit 503) to vessel segmentation sub-model 540 to adjust vessel segmentation mask 541. The user can be the same expert operator who enters user edit 501 or user edit 502, or a different expert operator. The human intervention may include mesh-based dragging of vessel boundary, pixelwise pencil and eraser tool to refine the vessel boundary. Consistent with some embodiments, an independent unit (not shown in FIG. 5) can be applied on user edit 503 to transform the various human operations into a uniform format which may be applied on vessel segmentation mask 541. Returning to FIG. 4, processor 408 may configured to export lesion analysis result 531 and vessel segmentation mask 541 (as examples of analysis results 120) out of image processing device 103 via bus 410. Analysis results may be shown in a display connected with image processing device 103, printed out on a medical report, or stored in an external storage.

Consistent with the present disclosure, model training device 102 can have same or similar structures as image processing device 103. In some embodiments, model training device 102 includes a processor, among other components, configured to train the vessel extraction sub-model, the lesion analysis sub-model, and the vessel segmentation sub-model individually or jointly using training data.

Figure 6:
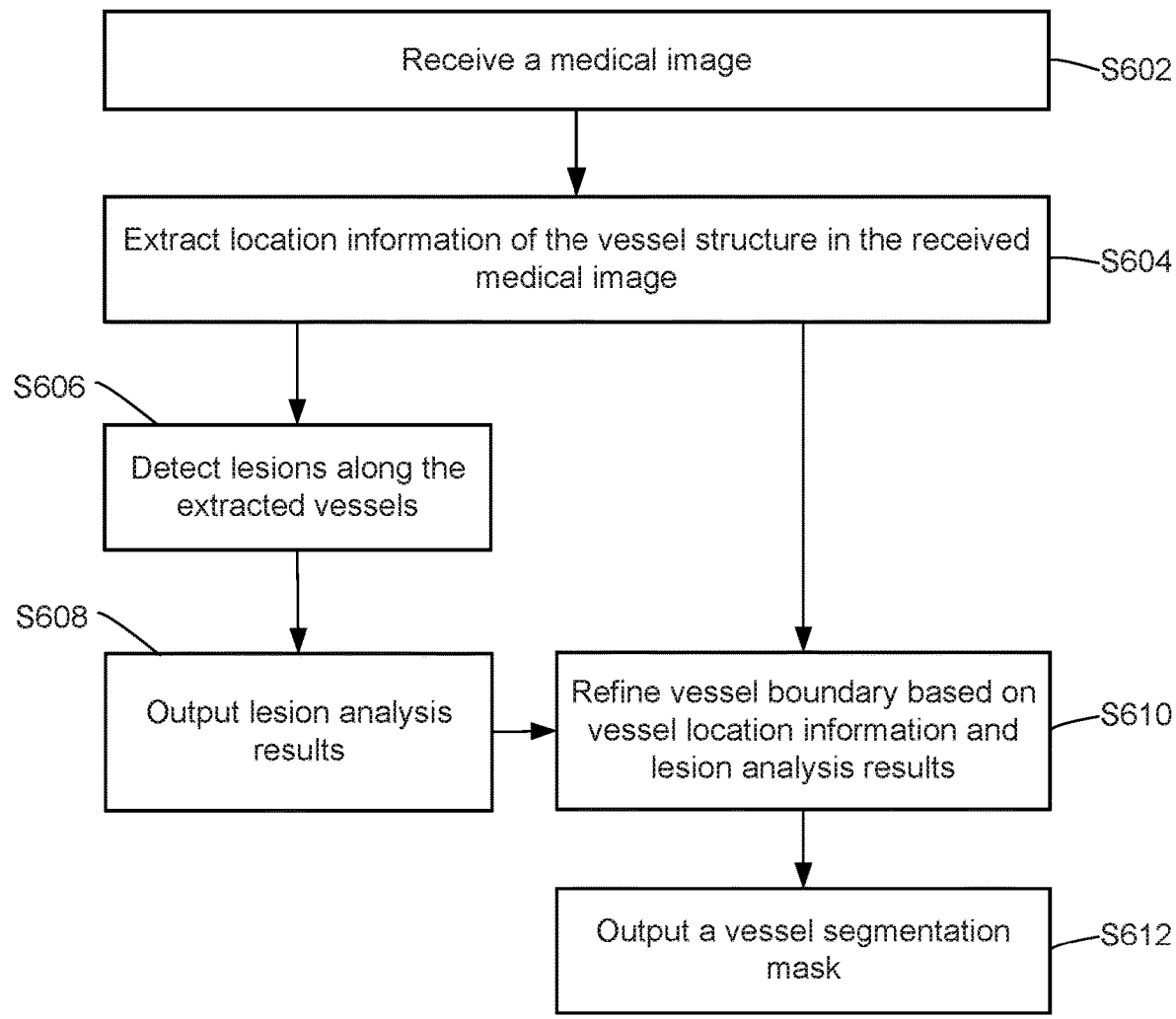
FIG. 6 is a flowchart of an exemplary method for analyzing a medical image containing a vessel structure, according to embodiments of the disclosure.

FIG. 6 is a flowchart of an exemplary method 600 for analyzing a medical image containing a vessel structure, according to embodiments of the disclosure. For example, method 600 may be implemented by image processing device 103 in FIG. 1 using a trained sequential model, such as model 200 in FIG. 2. However, method 600 is not limited to that exemplary embodiment. Method 600 may include steps S602-S612 as described below. It is to be appreciated that some of the steps may be optional to perform the disclosure provided herein. Further, some of the steps may be performed simultaneously, or in a different order than shown in FIG. 6.

In step S602, image processing device 103 receives a medical image, e.g., from medical image database 104. The medical image captures a vessel structure object, such as a blood vessel. Image processing device 103 may additionally receive a medical image analysis model, e.g., sequential model 500. Consistent with some embodiments, the image analysis model may include three sub-models (e.g., vessel extraction sub-model 520, lesion analysis sub-model 530, vessel segmentation sub-model 540). In some embodiments, image processing device 103 may also receive one or more human interventions (e.g., user edits 501, 502, or 503) entered by one or more expert operators.

In step S604, image processing device 103 extracts location information of the vessel structure contained in the received medical image. In some embodiments, a vessel extraction may be performed to locate a profile of the vessel structure (e.g., vessel centerline). For example, the centerline tracks the passageways of the vessel structure. In some embodiments, image processing device 103 may apply the received human intervention (e.g., user edits 501) on the extracted vessel locations to adjust the output vessel extraction result.

In step S606, image processing device 103 uses the extracted vessel location information to detect lesions along the vessel path. In some embodiments, image processing device 103 can also determine whether the detected lesion is calcified or non-calcified. Image processing device 103 can further determine a stenosis degree of each detected lesion. In some embodiments, image processing device 103 may apply the received human intervention (e.g., user edits 502) on the detected lesions to adjust the output lesion information, e.g., lesion location, lesion characterization, and lesion quantization. In step S608, image processing device 103 outputs the lesion information (e.g., lesion analysis result 531). For example, the lesion analysis result may be shown on a display connected with an external medical instrument or printed out in a medical report.

In step S610, image processing device 103 refines vessel boundary based on the vessel location information extracted in step S604 and the lesion analysis results output in step S608. For example, image processing device 103 can segment the vessel boundary precisely around lesion region based on the provided lesion analysis result in step S608 and generate a pixelwise vessel segmentation mask. In some embodiments, image processing device 103 may apply the received human intervention user edits 503) on the vessel segmentation mask to adjust the refined vessel boundary. In step S612, image processing device 103 outputs the refined vessel boundary (e.g., vessel segmentation mask 541). For example, the refined vessel boundary can be shown on a display connected with an external medical instrument or printed out in a medical report.

Although certain embodiments of the disclosure are described using a medical image containing a vessel structure as an example, it is contemplated that the disclosed systems and methods are not limited to analyze vessel-structure images. The sub-models in the sequential network, such as sequential model 200 of FIG. 2, are general models that can be adapted and trained to analyze any other images or non-image raw data.

For example, the disclosed systems and methods may be configured to analyze a medical image containing an organ (e.g., heart) and compute a coronary calcium score using a sequential model. The coronary calcium score is a clinic index score of cardiovascular disease risk. In some embodiments, the sequential model may include at least two sub-models: a coronary artery detection sub-model and a calcium detection sub-model. The coronary artery detection sub-model is configured to extract coronary artery wrapped around heart. The calcium detection sub-model then may take in the extracted coronary artery and detect calcium around the extracted coronary artery. The sequential model may further include other sub-models to compute the coronary calcium score based on the detected calcium. Because the sequential model is able to detect calcium only on the coronary artery but not on other vessels (e.g., aorta), the sequential model may obtain a better performance than a single coronary calcium detection model.

As another example, the disclosed systems and methods may include a sequential model configured to segment an organ (e.g., pancreas) in a medical image. Because the pancreas is a thin and long organ with variable shapes among different persons, training a single segmentation model for segmenting the pancreas is very challenging for achieving a satisfied segmentation result. In some embodiments, the sequential model may include two sub-models: a larger organ segmentation sub-model to segment larger organs (e.g., stomach, liver) surrounding the pancreas, and a pancreas segmentation sub-model to segment the pancreas based on results of the segmented larger organs. The sequential model therefore can easily exclude non-pancreas regions by segmenting the other larger organs, and provide an accurate segmentation mask of the pancreas.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system for analyzing a medical image containing a vessel structure using a sequential model, comprising:
  a communication interface configured to receive the medical image and the sequential model, wherein the sequential model includes a vessel extraction sub-model and a lesion analysis sub-model, wherein the vessel extraction sub-model and the lesion analysis sub-model are independently or jointly trained; and
  at least one processor, configured to:
    apply the vessel extraction sub-model on the received medical image to extract centerline location information of the vessel structure for detecting a lesion along the centerline of the vessel structure, wherein the centerline tracks passageways of the vessel structure;
    apply the lesion analysis sub-model on the received medical image and the centerline location information extracted by the vessel extraction sub-model to obtain a lesion analysis result of the vessel structure; and
    output the lesion analysis result of the vessel structure.

2. The system of claim 1, wherein the communication interface is configured to receive a first user edit and a second user edit, wherein the first user edit and the second user edit are independent from each other,
  wherein the at least one processor is further configured to:
    apply the vessel extraction sub-model additionally on the first user edit to extract centerline location information of the vessel structure; or
    apply the lesion analysis sub-model additionally on the second user edit to obtain a lesion analysis result of the vessel structure.

3. The system of claim 1, wherein the sequential model further comprises a vessel segmentation sub-model independently or jointly trained from the vessel extraction sub-model and the lesion analysis sub-model,
  wherein the at least one processor is further configured to:
    apply the vessel segmentation sub-model on the received medical image, the centerline location information extracted by the vessel extraction sub-model, and the lesion analysis result of the vessel structure obtained by the lesion analysis sub-model, to segment the vessel structure from the medical image.

4. The system of claim 3, wherein the communication interface is configured to receive a first user edit, a second user edit, and a third user edit, wherein the first user edit, the second user edit, and the third user edit are independent from each other,
  wherein the at least one processor is further configured to:
    apply the vessel extraction sub-model additionally on the first user edit to extract centerline location information of the vessel structure;
    apply the lesion analysis sub-model additionally on the second user edit to obtain a lesion analysis result of the vessel structure; or
    apply the vessel segmentation sub-model additionally on the third user edit to segment the vessel structure.

5. The system of claim 2, wherein the first user edit or the second user edit includes at least one of an editing mask, dragging, dropping, adding scribbles, or an erasing operation.

6. The system of claim 1, wherein the lesion analysis sub-model is configured to locate, characterize, or quantify a lesion associated with the vessel structure.

7. The system of claim 4, wherein the vessel segmentation sub-model is configured to refine a vessel boundary and generate a pixelwise vessel segmentation mask.

8. A method for analyzing a medical image containing a vessel structure using a sequential model, comprising:
  receiving, by a communication interface, the medical image and the sequential model, wherein the sequential model includes a vessel extraction sub-model and a lesion analysis sub-model, wherein the vessel extraction sub-model and the lesion analysis sub-model are independently or jointly trained;
  applying, by at least one processor, the vessel extraction sub-model on the received medical image to extract centerline location information of the vessel structure for detecting a lesion along the centerline of the vessel structure, wherein the centerline tracks passageways of the vessel structure;
  applying, by the at least one processor, the lesion analysis sub-model on the received medical image and the centerline location information extracted by the vessel extraction sub-model to obtain a lesion analysis result of the vessel structure; and
  outputting, by the at least one processor, the lesion analysis result of the vessel structure.

9. The method of claim 8, further comprising:
  receiving, by the communication interface, a first user edit and a second user edit, wherein the first user edit and the second user edit are independent from each other;
  applying, by the at least one processor, the vessel extraction sub-model additionally on the first user edit to extract centerline location information of the vessel structure; or
  applying, by the at least one processor, the lesion analysis sub-model additionally on the second user edit to obtain a lesion analysis result of the vessel structure.

10. The method of claim 8, wherein the sequential model further comprises a vessel segmentation sub-model independently trained from or jointly trained with the vessel extraction sub-model and the lesion analysis sub-model,
  wherein the method further comprises:

applying, by the at least one processor, the vessel segmentation sub-model on the received medical image, the centerline location information extracted by the vessel extraction sub-model, and the lesion analysis result of the vessel structure obtained by the lesion analysis sub-model, to segment the vessel structure from the medical image.

11. The method of claim 10, further comprising:
receiving, by the communication interface, a first user edit, a second user edit, and a third user edit, wherein the first user edit, the second user edit, and the third user edit are independent from each other;
applying, by the at least one processor, the vessel extraction sub-model additionally on the first user edit to extract centerline location information of the vessel structure;
applying, by the at least one processor, the lesion analysis sub-model additionally on the second user edit to obtain a lesion analysis result of the vessel structure; or
applying, by the at least one processor, the vessel segmentation sub-model additionally on the third user edit to segment the vessel structure.

12. The method of claim 9, wherein the first user edit or the second user edit includes at least one of an editing mask, dragging, dropping, adding scribbles, or an erasing operation.

13. The method of claim 8, further comprising:
locating, characterizing, or quantifying, by the at least one processor, a lesion associated with the vessel structure using the lesion analysis sub-model.

14. The method of claim 11, further comprising:
refining a vessel boundary and generating a pixelwise vessel segmentation mask, by the at least one processor, using the vessel segmentation sub-model.

15. A non-transitory computer-readable medium having a computer program stored thereon, wherein the computer program, when executed by at least one processor, performs a method for analyzing a medical image containing a vessel structure using a sequential model, the method comprising:
receiving the medical image and the sequential model, wherein the sequential model includes a vessel extraction sub-model and a lesion analysis sub-model, wherein the vessel extraction sub-model and the lesion analysis sub-model are independently or jointly trained;
applying the vessel extraction sub-model on the received medical image to extract centerline location information of the vessel structure for detecting a lesion along the centerline of the vessel structure, wherein the centerline tracks passageways of the vessel structure;
applying the lesion analysis sub-model on the received medical image and the centerline location information extracted by the vessel extraction sub-model to obtain a lesion analysis result of the vessel structure; and
outputting the lesion analysis result of the vessel structure.

16. The non-transitory computer-readable medium of claim 15, wherein the method further comprises:
receiving a first user edit and a second user edit, wherein the first user edit and the second user edit are independent from each other;
applying the vessel extraction sub-model additionally on the first user edit to extract centerline location information of the vessel structure; or
applying the lesion analysis sub-model additionally on the second user edit to obtain a lesion analysis result of the vessel structure.

17. The non-transitory computer-readable medium of claim 15, wherein the sequential model further comprises a vessel segmentation sub-model independently trained from or jointly trained with the vessel extraction sub-model and the lesion analysis sub-model,
wherein the method further comprises:
applying the vessel segmentation sub-model on the received medical image, the centerline location information extracted by the vessel extraction sub-model, and the lesion analysis result of the vessel structure obtained by the lesion analysis sub-model, to segment the vessel structure from the medical image.

18. The non-transitory computer-readable medium of claim 17, wherein the method further comprises:
receiving a first user edit, a second user edit, and a third user edit, wherein the first user edit, the second user edit, and the third user edit are independent from each other;
applying the vessel extraction sub-model additionally on the first user edit to extract centerline location information of the vessel structure;
applying the lesion analysis sub-model additionally on the second user edit to obtain a lesion analysis result of the vessel structure; or
applying the vessel segmentation sub-model additionally on the third user edit to segment the vessel structure.

* * * * *